April 3, 1945.  H. C. SWIFT  2,372,748
FLUID COUPLING
Filed April 14, 1941
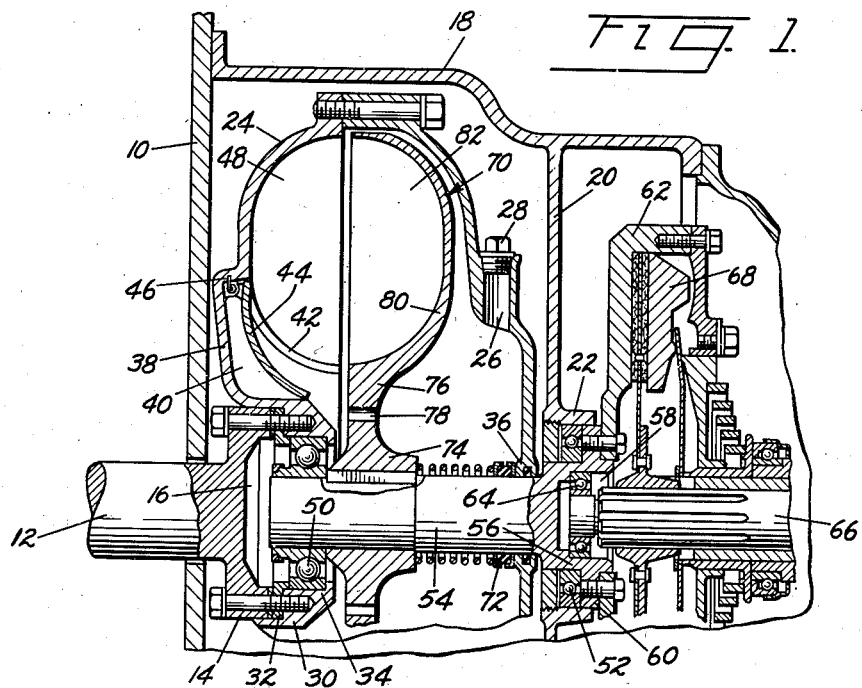
Fig. 1.
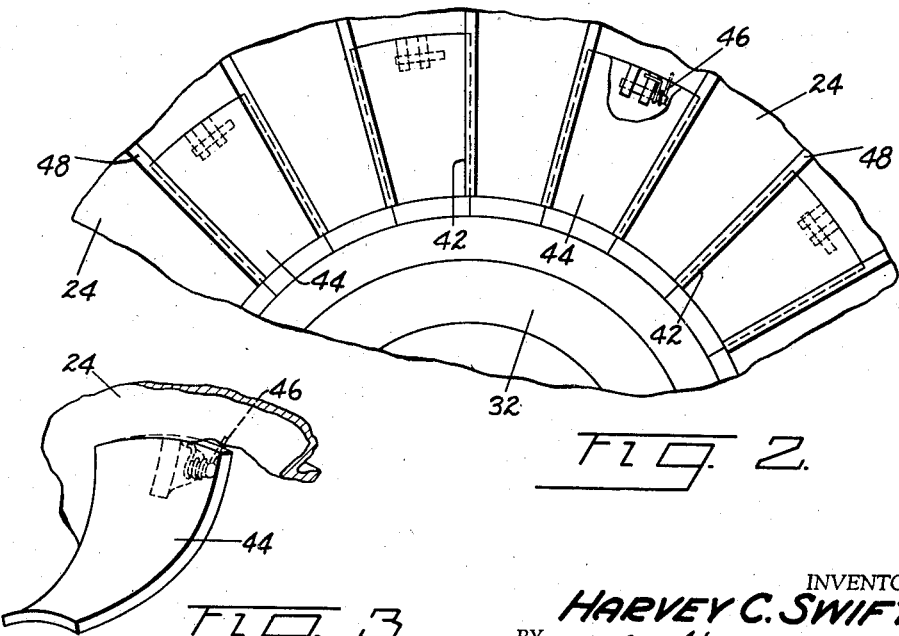
Fig. 2.
Fig. 3.
INVENTOR.
HARVEY C. SWIFT
BY
ATTORNEY Patented Apr. 3, 1945

2,372,748

UNITED STATES PATENT OFFICE 2,372,748

FLUID COUPLING

Harvey C. Swift, Detroit, Mich., assignor to Hydraulic Brake Company, Detroit, Mich., a corporation of California Application April 14, 1941, Serial No. 388,542

4 Claims. (Cl. 60—54)

This invention relates to fluid couplings.

The invention comprehends a fluid coupling including an impeller, a runner associated therewith, and means effective for inhibiting drag on the runner when it is static and the impeller rotating at idling speed.

An object of the invention is to provide a fluid coupling including an impeller and a runner providing in conjunction with one another a fluid circuit, and means for diverting the circuit when the runner is static and the impeller rotating slowly.

Another object of the invention is to provide a fluid coupling including an impeller and a runner providing a fluid circuit, and means for dumping fluid from the circuit.

Another object of the invention is to provide a fluid coupling including an impeller and a runner providing in conjunction with one another a fluid circuit automatically controlled by means activated by centrifugal force resulting from rotation of the coupling.

Other objects and advantages of the invention will appear from the following description taken in connection with the drawing forming a part of this specification, and in which—

Fig. 1 is a sectional view partly broken away illustrating a fluid coupling embodying the invention;

Fig. 2 is a front elevation of the impeller partly broken away; and

Fig. 3 is a perspective view illustrating one of the gates.

Referring to the drawing for more specific details of the invention, 10 represents the crank case of an internal combustion engine, and 12 the crank shaft of the engine having a flange 14 provided with a concentrically disposed recess 16. A bell housing 18 suitably secured to the crank case 10 has an internal web 20 provided with a bearing support 22 axially disposed with relation to the driving shaft 12.

A housing 24 enclosed by the bell housing 18 has a filling opening 26 normally closed as by a plug 28. The housing 24 has a concentrically disposed hub 30 bolted or otherwise secured to the flange 14 of the crank shaft with a retaining ring 32 and a suitable sealing gasket interposed, and the hub has a bearing support 34 concentrically disposed with relation thereto and in axial alignment with the shaft 12. The housing also has a hub 36 oppositely disposed and in concentric relation to the hub 30.

The wall of the housing adjacent the hub 30 has an offset section 38 providing an annular chamber 40 communicating with the interior of the housing 24 by way of spaced openings 42 controlled as by gates 44 normally held open as by springs 46. The housing 24 constitutes the outer shroud of an impeller and suitably mounted on the inner wall of the housing are spaced impeller blades 48 normal to the side edges of the gates and adapted to limit motion of the gates in one direction.

Bearings 50 are mounted on the bearing support 34 in the hub 30 of the housing 24, and a bearing 52 is mounted on the bearing support 22 in the internal web 20 of the bell housing. These bearings support for rotation a center shaft 54 in axial alignment with the driven shaft.

One end of the center shaft 54 is received by the recess 16 in the flange 14 of the driving shaft with substantial clearance, and the center shaft extends concentrically through the housing 24, and the hub 36 thereof. The other end of the center shaft has an enlarged portion 56 for the reception of the bearing 52, and this enlarged portion has a concentric bore 58 and a circumferential flange 60 supporting a clutch member 62, and a bearing 64 fitted in the bore 58 supports for rotation a driven shaft 66 having thereon an axially movable clutch member 68 for cooperation with the clutch member 62.

A runner 70 is keyed to the center shaft within the housing 24 in oppositely disposed relation to the impeller, and a fluid sealing means 72 is interposed between the runner and the hub 36 for inhibiting seepage of fluid from the housing 24. The runner includes a hub 74 having a web 76 provided with spaced openings 78 affording communications between the chamber 40 and the housing 24 proper, and the web supports an outer shroud 80 having suitably mounted thereon spaced runner blades 82.

In a normal operation, assuming that the housing 24 constituting the reservoir is filled with suitable fluid to a predetermined degree of its capacity, sufficient to allow for expansion of the fluid due to heat, upon initial actuation or rotation of the housing by force received from the driving shaft 12, the fluid in the housing is energized by the impeller and by centrifugal force as a result of rotation of the housing. The energy of the fluid moving under these forces is received on the blades 82 of the runner 70, causing rotation of the runner. During this operation, centrifugal force acting on the gates 44 move the gates against the resistance of the springs 46 to close the openings 42 between the fluid circuit and the chamber 40 so as to more effectively surround the fluid circuit.

During normal and high speeds of rotation, the gates 44 are retained closed under the influence of the centrifugal force, and when the speed of rotation decreases, as when approaching a stop, the gates 44 are moved to the open position under the influence of the springs 46. This results in quickly dumping the fluid in the fluid circuit through the openings 42 into the chamber 40 where it impinges on the web 76 and then passes through the openings 78 in the web into the reservoir or housing 24. Thereafter, the runner 70 remains static, and the impeller rotating at an idling speed does not impose objectional drag on the runner since the fluid is diverted from its normal operative circuit.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid coupling comprising a rotatable housing having an offset chamber communicating with the housing, gates in the wall of the housing for control of the communication activated by centrifugal force, impeller blades arranged on the housing between the communications, limiting movement of the gates in one direction, and a runner in the housing for cooperation with the impeller.

2. A fluid coupling comprising a rotatable housing having an offset chamber communicating with the housing by spaced openings, gates on the housing for control of the openings activated by centrifugal force, impeller blades on the housing supporting the gates when in closed position, and a runner in the housing for cooperation with the impeller.

3. A fluid coupling comprising a rotatable housing having an annular offset chamber communicating with the housing by spaced openings, gates pivoted on the housing for control of the openings activated by centrifugal force, impeller blades carried by the housing, and a runner within the housing for cooperation with the impeller having means providing communication between the housing and the offset chamber.

4. A fluid coupling comprising a circular rotatable housing constituting a reservoir having an annular concentrically disposed offset chamber communicating with the housing by spaced openings and an opening at the inner perimeter of the housing, gates for control of the spaced openings activated by centrifugal force, an impeller carried by the housing, and a runner within the housing for cooperation with the impeller having a web adjacent the opening of the offset chamber at the inner perimeter of the housing said web having spaced openings providing communication between the offset chamber and the reservoir.

HARVEY C. SWIFT.